(12) United States Patent
Konrad (10) Patent No.: US 10,052,980 B2
(45) Date of Patent: Aug. 21, 2018

(54) VEHICLE SEAT ASSEMBLY

(71) Applicant: Nissan North America, Inc., Franklin, TN (US)

(72) Inventor: James Konrad, Windsor (CA)

(73) Assignee: Nissan North America, Inc., Franklin, TN (US)

( * ) Notice: Subject to any disclaimer, the term of this patent is extended or adjusted under 35 U.S.C. 154(b) by 21 days.

(21) Appl. No.: 15/246,173

(22) Filed: Aug. 24, 2016

(65) Prior Publication Data

US 2018/0056821 A1 Mar. 1, 2018

(51) Int. Cl.
*B60N 2/28* (2006.01)
*B60N 2/005* (2006.01)

(52) U.S. Cl.
CPC .......... *B60N 2/2806* (2013.01); *B60N 2/005* (2013.01)

(58) Field of Classification Search
CPC ..... B60N 2/2887; B60N 2/2806; B60N 2/005
See application file for complete search history.

(56) References Cited

U.S. PATENT DOCUMENTS

| | | | |
|---|---|---|---|
| 6,582,016 B1* | 6/2003 | Kirchoff | B60N 2/286 297/253 |
| 6,601,917 B1* | 8/2003 | Christopherson | B60N 2/2821 24/633 |
| 7,281,763 B1* | 10/2007 | Hayashi | B60N 2/2893 297/253 |
| 7,699,396 B2* | 4/2010 | Ghisoni | B60N 2/58 297/188.2 |
| 9,493,099 B2* | 11/2016 | Ruthinowski | B60N 2/70 |
| 9,592,750 B2* | 3/2017 | Asaeda | B60N 2/58 |
| 2002/0104190 A1* | 8/2002 | Moore | B60N 2/2809 16/231 |
| 2007/0176476 A1* | 8/2007 | Weber | B60N 2/2893 297/253 |
| 2015/0084388 A1 | 3/2015 | Arai et al. | |
| 2016/0200224 A1* | 7/2016 | Fujikake | B60N 2/289 297/452.38 |

FOREIGN PATENT DOCUMENTS

DE 10044621 C1 2/2002

OTHER PUBLICATIONS

Cristina Echemendia, NHTSA's Research & Rulemaking Activities on Child Passenger Safety, Government Industry Meeting 2015, Jan. 22, 2015, NHTSA, Washington, D.C., U.S.A.
(Continued)

*Primary Examiner* — Philip F Gabler (57) ABSTRACT

A seat portion has a passenger receiving surface coinciding with a first plane. The seat portion has a resilient cushioning material with a recessed area defined therein. A tether wire for securing child seat is located within the recessed area. A tether cover assembly has a housing defining a door opening and at least one door configured to move from a closed position concealing the tether wire and the door opening, and an open position exposing the tether wire and the door opening. The housing is installed within the recessed area such that with the door in the closed position the door coincides with or is parallel to the first plane. Movement of the door from the closed position to the open position includes the door moving along a path that coincides with or is parallel to the first plane.

19 Claims, 9 Drawing Sheets

(56) References Cited

OTHER PUBLICATIONS

Vehicle LATCH Hardware Evaluation Protocol (Version II), Nov. 2015, Insurance Institute for Highway Safety, Virginia, U.S.A.
IIHS LATCH Measurement Tool Set Drawings, Mar.-Jun. 2015, Insurance Institute for Highway Safety Highway Loss Data Institute, Virginia, U.S.A.

* cited by examiner

VEHICLE SEAT ASSEMBLY

BACKGROUND

Field of the Invention

The present invention generally relates to a vehicle seat assembly that includes a tether wire for securing, for example, a child's or infant's seat. More specifically, the present invention relates to a vehicle seat assembly that includes a tether cover assembly that conceals the tether wire of the vehicle seat assembly when the tether wire is not in use.

Background Information

A rear seat assembly of a vehicle includes at least one wire tether that is a rigid part of the frame structure of the rear seat assembly. The wire tether is designed for the purpose of securing a child's or infant's seat installed on the rear seat assembly. The wire tether is a rigid member that can be approximately 6 mm in diameter. Typically, the wire tether is concealed between a horizontal portion of the seat and a vertical upright portion of the seat assembly. New proposed regulations suggest locating the tether wire within a recess formed in a lower portion of the upright portion of the seat assembly.

SUMMARY

One object of the present disclosure is to provide a vehicle seat assembly with a tether cover assembly that includes a sliding door that conceals a tether wire when in a closed position and provides easy access to the tether wire in an open position.

In view of the state of the known technology, one aspect of the present disclosure is to provide a vehicle seat assembly with a seat portion, a tether wire and a tether cover assembly. The seat portion has a passenger receiving surface configured and shaped to contact a portion of a passenger seated there-against. At least a portion of the passenger receiving surface coincides with a first plane. The seat portion has a resilient cushioning material disposed therein. A recessed area is defined within the resilient cushioning material and is open to the passenger receiving surface. The tether wire is configured for securing child seat to the seat assembly is located within the recess. The tether cover assembly has a housing defining a door opening and at least one door. The door is configured to move from a closed position concealing the tether wire and the door opening, and an open position exposing the tether wire and the door opening. The housing is installed within the recessed area such that with the door in the closed position the door coincides with or is parallel to the first plane, and movement of the door from the closed position to the open position includes at least a free end of the door moving along a path that coincides with or is parallel to the first plane.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
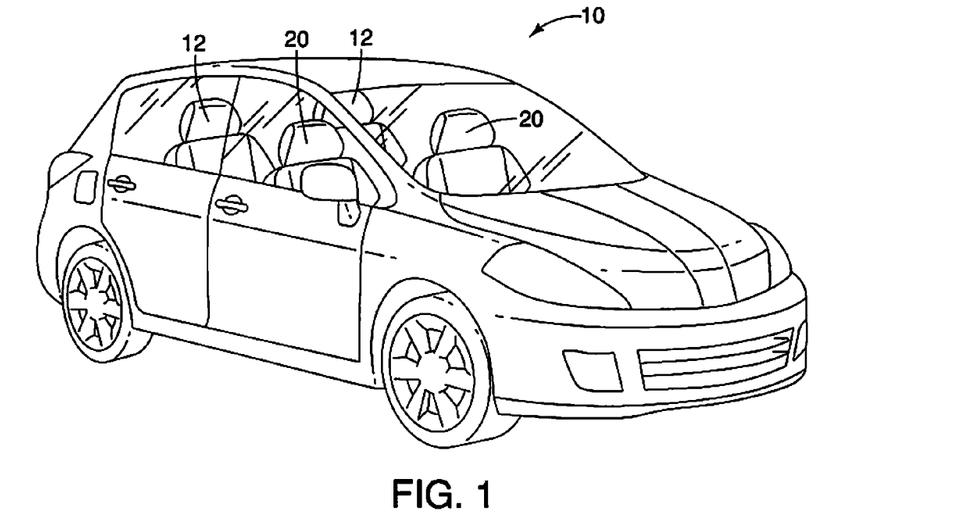
FIG. 1 is a perspective view of a vehicle having front seats and rear seats in accordance with a first embodiment.

Referring initially to FIG. 1, a vehicle 10 having a rear seat 12 that includes a tether wire 14 (FIG. 4) for securing a child's seat is illustrated in accordance with a first embodiment. The rear seat 12 further includes a tether cover assembly 16 (FIGS. 2-4) that conceals the tether wire 14 in a manner described in greater detail below.

The vehicle 10 is a conventional vehicle and can be a four door sedan, as depicted in FIG. 1, or can alternatively be a coupe, a sports utility vehicle (SUV), pick-up truck with a crew seat behind a front row of seats or a luxury sedan. In other words, the rear seat 12 described in greater detail can be installed in any of a variety of vehicle designs and configurations and is not limited to the four door sedan depicted in FIG. 1.

The vehicle 10 includes a front row of seats 20 and the rear seats 12. Currently, tether wires such as the tether wire 14 are installed at or within the rear seats 12. However, it should be understood from the drawings and the description herein that it is possible to include at least one of the tether wires 14 in one or both of the front seats 20, and further provide the front seats 20 with the tether cover assembly 16 in a manner described further below with reference to the rear seats 12.

Figure 2:
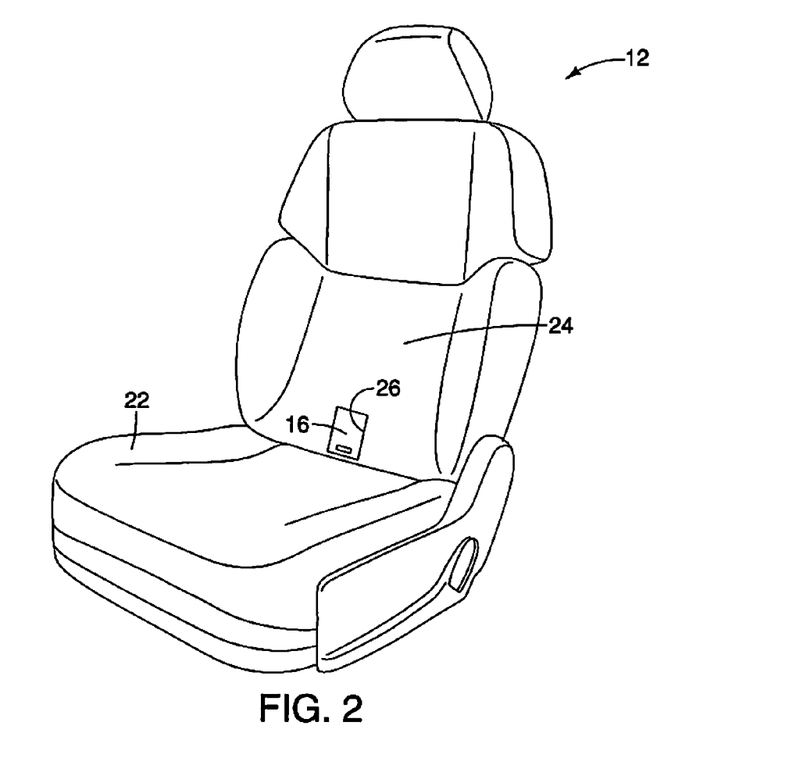
FIG. 2 is a perspective view of one of the rear seats removed from the vehicle depicted in FIG. 1, showing a tether cover assembly that conceals a tether wire in accordance with the first embodiment.
Figure 3:
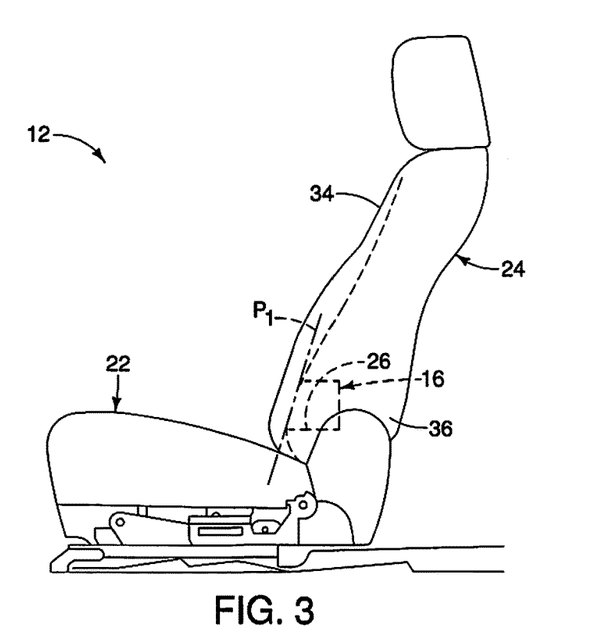
FIG. 3 is a side view of the rear seat depicted in FIG. 2 showing details of the tether cover assembly in accordance with the first embodiment.

A description of the rear seat 12 is now provided with specific reference to FIGS. 2 and 3. The vehicle 10 is provided with at least two rear seats 12. In the depicted embodiment, the two rear seats 12 are each single passenger seats, sometimes referred to as bucket seats. However, it should be understood from the drawings and the description herein that the tether wire 14 and the tether cover assembly 16 can alternatively be installed to a bench-style rear seat. Since the rear seats 12 are generally the same as one another, a description of only one rear seat 12 is provided for the sake of brevity. It should be understood from the description and drawings that a description of one of the rear seats 12 applies equally to both of the rear seats 12, as well as front seats 20 within the vehicle 10.

Figure 4:
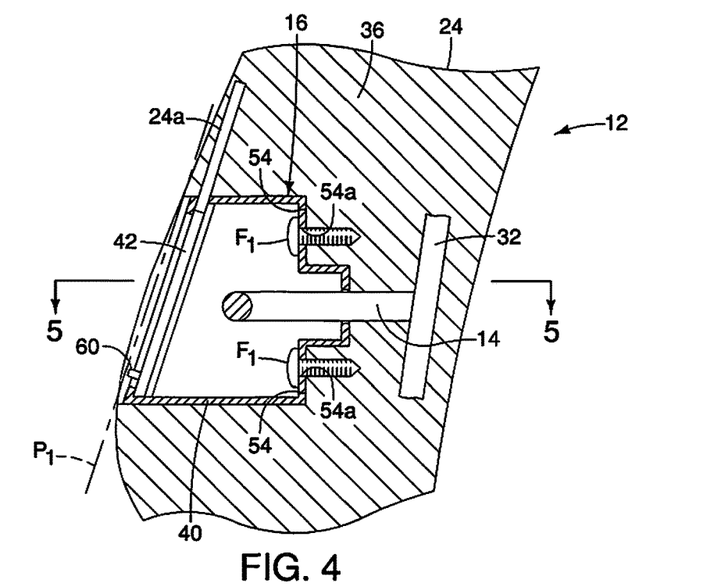
FIG. 4 is a side cross-sectional view of a portion of the rear seat depicted in FIGS. 2 and 3, showing a housing and a door of the tether cover assembly installed within the seat surrounding a tether wire in accordance with the first embodiment.

As shown in FIGS. 2 and 3, the seat assembly 12 includes a lower cushion portion 22 and an upright cushion portion 24. A lower end of the upright cushion portion 24 includes a recessed area 26. The upright cushion portion 24 (a seat portion) defines a passenger receiving surface 30 that is configured and shaped to contact a portion of a passenger (not shown) seated there-against. In FIGS. 2, 3 and 4, the passenger receiving surface 30 is provided with a very specific overall shape and contour. It should be understood from the drawings and the description herein that the depicted shape of the passenger receiving surface 30 is just one example of surfaces of the upright cushion portion 24. The passenger receiving surface 30 can be provided with alternative overall shapes and contours that differ from those depicted.

In the depicted embodiment, the passenger receiving surface 30 is shown as a generally upright or upwardly extending surface that the passenger leans back against while riding in the vehicle 10. At least a lower portion of the passenger receiving surface 30 defines and/or coincides with a first plane $P_1$. The first plane $P_1$ is inclined relative to a vertical direction. However, it should be understood from the drawing and the description herein that the orientation of the first plane $P_1$ is also a function of the positioning of the upright cushion portion 24. Specifically, the upright cushion portion 24 can be configured for inclined displacement, depending upon the vehicle design and seat design. Since the first plane $P_1$ is defined relative to the passenger receiving surface 30, when the passenger receiving surface 30 is angularly repositioned with inclining movement of the upright cushion portion 24, the first plane $P_1$ is similarly inclined. Further, if the upright cushion portion 24 is moved to a more vertical orientation, the first plane $P_1$ can also be oriented to be vertical.

The first plane $P_1$ is defined as being geometrically normal to curvature of the passenger receiving surface 30 of the upright cushion portion 24 at a location approximately level with the tether wire 14 (with the passenger receiving surface 30 in a generally upright orientation, such as that shown in FIG. 4). Alternatively, the first plane $P_1$ can be defined by upper and lower edges of the recessed area 26, as indicated in FIG. 4.

The upright cushion portion 24 includes a metallic frame 32 (partially shown in FIG. 4), a cover material 34 and a resilient cushioning material 36. The recessed area 26 is defined within the resilient cushioning material 36 and is open to the passenger receiving surface 30.

The metallic frame 32 can be any of a variety of seat frame structures. Only a portion of the metallic frame 32 is shown in FIG. 4. The metallic frame 32 includes a rigid frame that can be rectangular in shape with lattice structural elements extending from one side to another side thereof. Since rigid seat frame structures are conventional structures, further description is omitted for the sake of brevity. The cover material 34 can be leather, synthetic leather or textile material that surrounds and covers the resilient cushioning material 36. The resilient cushioning material 36 can be any of a variety of materials that provide support and comfort to a passenger seated on the rear seat 12. The resilient cushioning material 36 is attached to and supported by the metallic frame 32 in a conventional manner.

As shown in cross-section in FIG. 4, tether wire 14 is rigidly fixed to the metallic frame 32. More specifically, the tether wire 14 is non-movably fixed relative to the upright cushion portion 24, and moves with the upright cushion portion 24, if the upright cushion portion 24 is moved between an upright orientation (FIGS. 2, 3 and 4) and an inclined orientation (not shown). The tether wire 14 is positioned at a location within the rear seat 12 and is of sufficient diameter and strength so as to support a child seat or other similar structure supported on the rear seat 12 to restrict and/or prevent movement of the child seat in accordance with the IIHS (Insurance Institute for Highway Safety) Vehicle LATCH Hardware Evaluation Protocol (Version II), November 2015, which is incorporated herein by reference in its entirety. The tether wire 14 is further designed and configured to meet the requirements of Federal Motor Vehicle Safety Standard No. 213 (FMVSS No. 213).

As is also shown in FIG. 4, the tether wire 14, the recessed area 26 and the tether cover assembly 16 are all positioned such that the tether wire 14 is easily accessed via the tether cover assembly 16, as is described in greater detail below.

A description of the tether cover assembly 16 is now provided with specific reference to FIGS. 4-8. The tether cover assembly 16 includes a housing 40 and a cover or door 42. The housing 40 has an upper wall 44, side walls 46, a lower wall 48, a rear wall 50 and a front opening section 52. The upper wall 44 is a solid wall that includes a door slot 44a. The door slot 44a is dimensioned such that when the door 42 is moved from a closed position to an open position, the door 42 can move out of the housing 40 via the door slot 44a. The side walls 46 and the lower wall 48 are depicted as being solid walls, but can alternatively have gaps or holes to reduce the amount of material used to form the housing 40.

The rear wall 50 includes a slot or opening 50a dimensioned to receive the tether wire 14. Specifically, when the housing 40 is installed to the upright cushion portion 24, the housing 40 is pushed into the recessed area 26 such that the tether wire 14 extends into and through the opening 50a.

At the intersections of the upper wall 44 and the rear wall 50, and also at the intersections of the lower wall 48 and the rear wall 50, fastener sections 54 are formed. The fastener sections 54 each include at least one surface that is spaced apart from the rear wall 50 that defines a fastener opening 54a (FIG. 4) with fasteners $F_1$ inserted therethrough for attachment to the resilient cushioning material 36 and/or to a portion (not shown) of the metallic frame 32.

Figure 5:
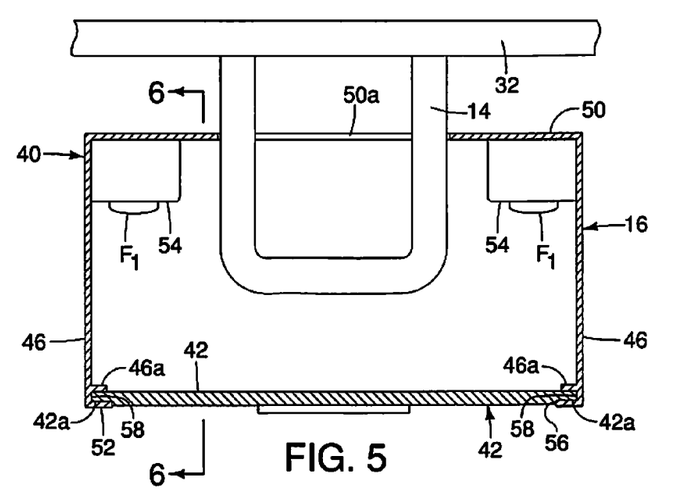
FIG. 5 is a top cross-sectional view of the portion of the rear seat taken along the line 5-5 in FIG. 4, showing the housing and the door of the tether cover assembly and the tether wire in accordance with the first embodiment.

The front opening section 52 is basically an overhang or lip that defines a door opening 56. Each of the side walls 46 includes a ridge or lip 46a located adjacent to the front opening section 52 that protrudes inward toward the door opening 56. The lips 46a further extend parallel to the front opening section 52. The front opening section 52 and the lip 46a define a track 58 therebetween along each of the side walls 44, as shown in FIG. 5.

The door 42 is a flat planar element that includes recessed edges 42a and a handle 60. The door 42 is configured to move from the closed position (FIG. 7) concealing the tether wire 14 and the door opening 56 and the open position (FIGS. 6 and 8) exposing the tether wire 14 and the door opening 56. As shown in FIG. 4, the resilient cushioning material 36 of the upright cushion portion 24 can be formed with a pocket 24a dimensioned to receive the door 42 when the door 42 is moved to the open position.

Figure 6:
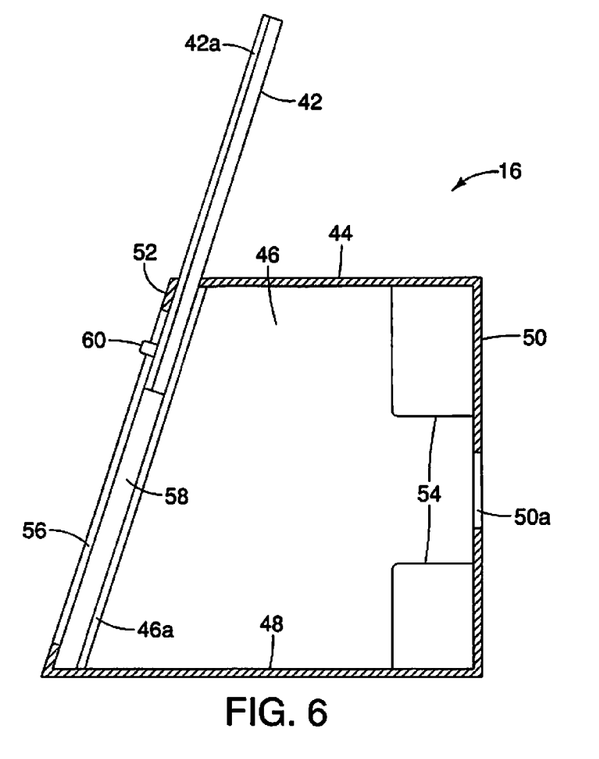
FIG. 6 is a cross-sectional view of the tether cover assembly taken along the line 6-6 in FIG. 5 showing details of the housing and the door with the door slid to an open position in accordance with the first embodiment.
Figure 7:
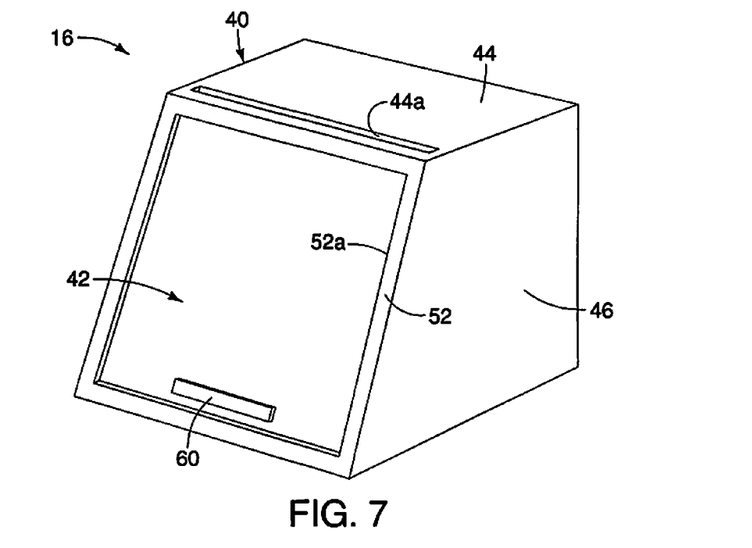
FIG. 7 is a perspective view of the tether cover assembly removed from the seat showing details of the housing and the door with the door in a closed position in accordance with the first embodiment.
Figure 8:
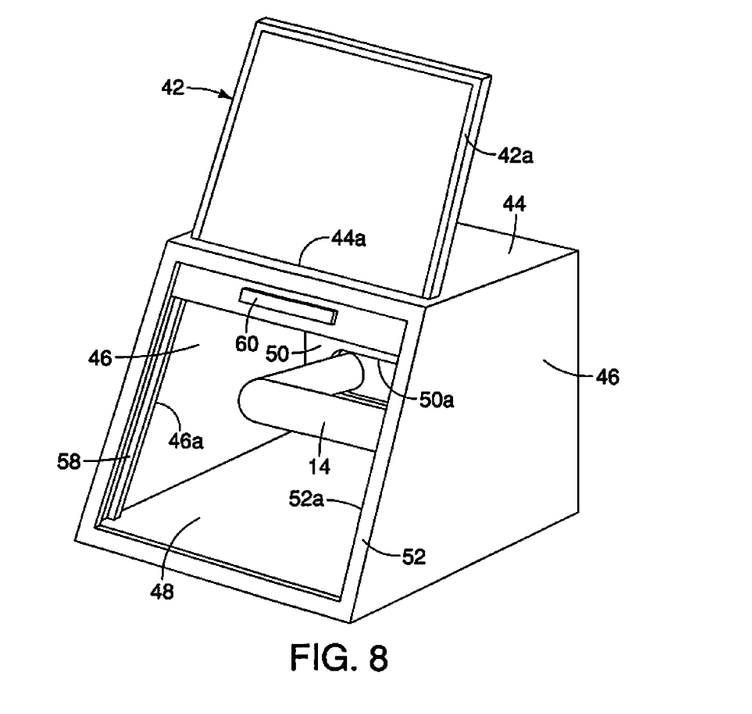
FIG. 8 is another perspective view of the tether cover assembly similar to FIG. 7 showing details of the housing and the door with the door slid to the open position in accordance with the first embodiment.

The recessed edges 42a are located along the lateral sides of the door 42 and are dimensioned for insertion into the opposing tracks 58. Further, the door 42 is configured and dimensioned to slide up and down along the tracks 58 between the closed position (FIG. 7) and the open position (FIG. 8). The door 42 has a first overall thickness and the recessed edges 42a having a second thickness that is less than the first thickness of the door 42. The handle 60 is rigidly fixed to the door 42 and located to project out of the door opening 56. The handle 60 can be separately attached to the door 42 or can be integrally formed or molded with the door 42. The handle 60 provides a user with a means for moving the door 42 between the open position and the closed position. In FIG. 6, the handle 60 is shown with a rectangular side profile. However, it should be understood from the drawings and the description herein that the handle 60 can have an overall curved or rounded shape.

As is shown in FIG. 4, the housing 40 is installed within the recessed area 26 such that with the door 42 in the closed position the door coincides with or is parallel to the first plane $P_1$. Further, movement of the door 42 from the closed position to the open position includes at least a free end of the door moving along a path that coincides with or is parallel to the first plane $P_1$. Further, except for the handle 60, the door 42 slides within space (the recessed area 26 and the pocket 24a) that is confined within the resilient cushioning material 26 and bounded by the first plane $P_1$. In other words, the door 42 is always located along the first plane $P_1$ or is confined within the resilient cushioning material 26 without crossing or moving to an opposite side of the first plane $P_1$.

In the first embodiment, the door 42 is configured to move in a vertical direction from the closed position to the open position along the tracks 58 (linear tracks). Alternatively, the door 42 can be configured to slide in a horizontal direction (see the second embodiment below). Further, the tracks 58 can be configured to coincide with or are parallel to the first plane $P_1$.

In the first embodiment, an upper front end of the housing 40 and a lower front end of the housing 40 are not vertically aligned. Specifically, when installed into the recessed area 26 of the rear seat 12, the lower front end of the housing 40 is located more forward of the upper front end of the housing 40 in a vehicle longitudinal direction. It should be understood from the drawings and the description herein than inclined orientation of the front opening section 52 of the housing 40 is a function of the overall shapes and contours of the lower end of the upright cushion portion 24 of the rear seat 12. The front opening section 52 can be re-oriented and made more vertical, or inclined with an upper end thereof being more forward in the vehicle longitudinal direction relative than the lower end of the front opening section 52 in accordance with an overall design and shape of the rear seat 12.

In the first embodiment (and all embodiments described below) the movement of the door 42 between the closed position and the open position is confined to movement at a first side of the first plane $P_1$, where the first side of the first plane $P_1$ is a rearward side thereof relative to the longitudinal direction of the vehicle 10. A second side of the first plane $P_1$ is a forward side thereof relative to the longitudinal direction of the vehicle 10. The forward side of the first plane $P_1$ is the space that a passenger occupies when sitting on the rear seat 12 (relative to the recessed area 26 of the rear seat 12). Since the door 42 is confined to move within the space defined relative to a second side of the first plane $P_1$, (spaces within the resilient cushioning material 36), the door 42 does not cross through the first plane $P_1$ to the second side of the first plane $P_1$ and to the passenger receiving area. In other words, the structure of the housing 40 prevents the door 42 from crossing or passing through the first plane $P_1$ to the second side of the first plane $P_1$ and to the passenger receiving area of the rear seat 12.

Second Embodiment

Figure 9:
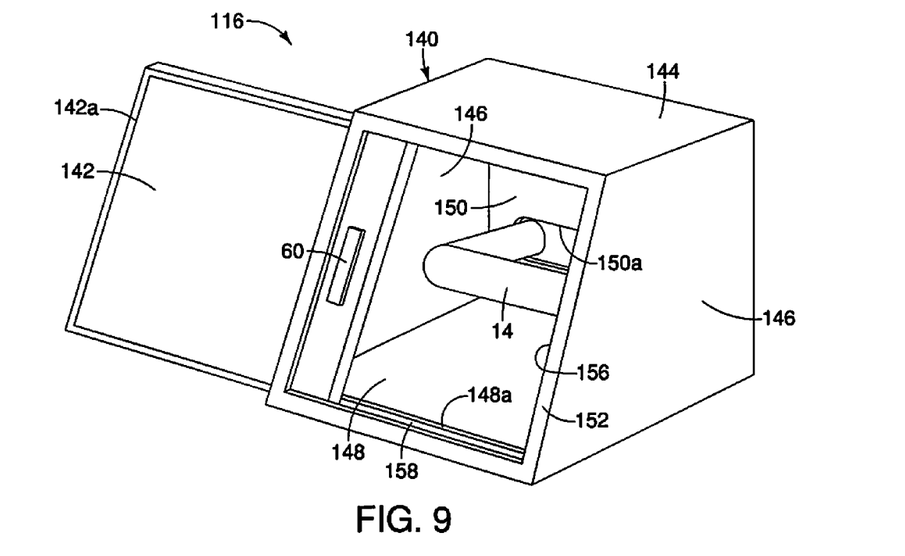
FIG. 9 is a perspective view of a tether cover assembly having a housing and a door with the door slid to an open position in accordance with a second embodiment.
Figure 10:
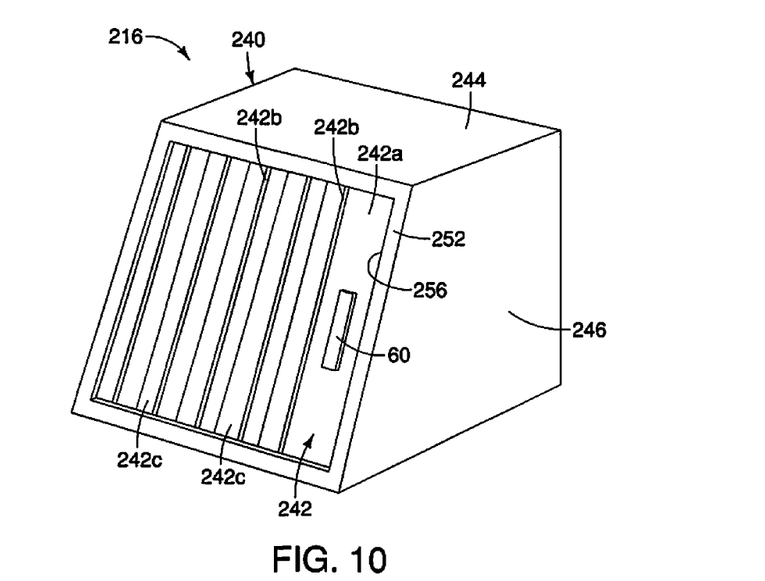
FIG. 10 is a perspective view of a tether cover assembly having a housing and a door with the door slid to a closed position in accordance with a third embodiment.
Figure 11:
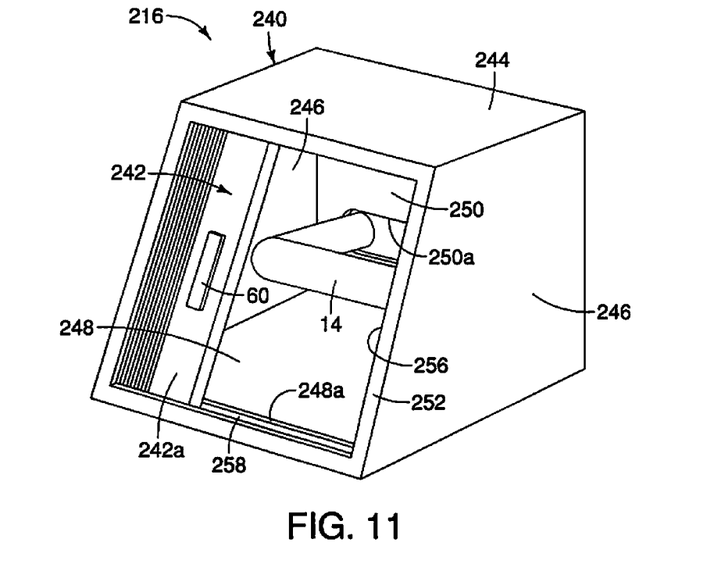
FIG. 11 is another perspective view of the tether cover assembly depicted in FIG. 10 showing details of the housing and the door with the door slid to an open position in accordance with the third embodiment.

Referring now to FIG. 9, a tether cover assembly 116 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The tether cover assembly 116 includes a housing 140 and a door 142. The housing 140 includes an upper wall 144, a lower wall 148, a rear wall 150 and a front opening section 152. The upper wall 144 is similar to the upper wall 44, except the upper wall 144 does not includes the door slot 44a. Rather, the upper wall 144 includes a lip (not visible) that defines one of two tracks that receive the door 142 such that the door can slide between an open position shown in FIG. 9 and a closed position (not shown). The side walls 146 are identical to the side walls 46 of the first embodiment, except that one of the side walls 146 includes a door slot (not visible) that allows the door 142 move horizontally between the closed position and the open position. The lower wall 148 includes a lip 148a that extends parallel to the front open section 152 defining a track 158 that receives the door 142 confining the door 142 to horizontal sliding movement.

The rear wall 150 is basically the same as the rear wall 50 of the first embodiment and includes an opening 150a that receives the tether wire 14. The front opening section 152 is basically the same as the front opening section 52 of the first embodiment and defines the opening 156.

As shown in FIG. 9, the door 142 is configured to move in a horizontal direction between the closed position and the open position.

Third Embodiment

Referring now to FIGS. 10-13, a tether cover assembly 216 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The tether cover assembly 216 includes a housing 240 and a door 242. The housing 240 includes an upper wall 244, a lower wall 248, a rear wall 250 and a front opening section 252. The upper wall 244 is similar to the upper wall 44, except the upper wall 244 does not includes the door slot 44a. The side walls 246 are identical to the side walls 46 except that there are no lips on the inner surfaces of the side walls 246. The upper wall 244 includes a lip (not shown) and the lower wall 248 includes a lip 248a that each define a track 258 (only the lower track 258 is visible in FIG. 11). The lower track 258 and a corresponding upper track (not shown) confine the door 242 such that the door 242 undergoes sliding movement along the tracks 258.

The rear wall 250 is basically the same as the rear wall 50 of the first embodiment and includes an opening 250a that receives the tether wire 14. The front opening section 252 is basically the same as the front opening section 52 of the first embodiment and defines the opening 256.

Figure 12:
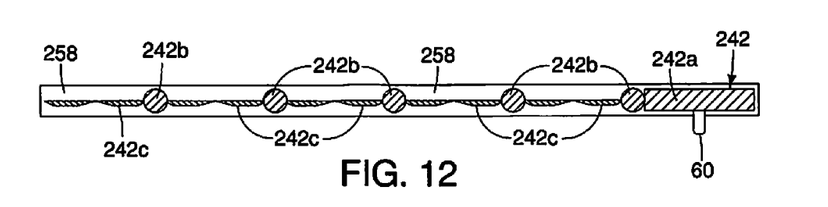
FIG. 12 is a cross-sectional view of a portion of the housing showing the door in the closed position in accordance with the third embodiment.
Figure 13:
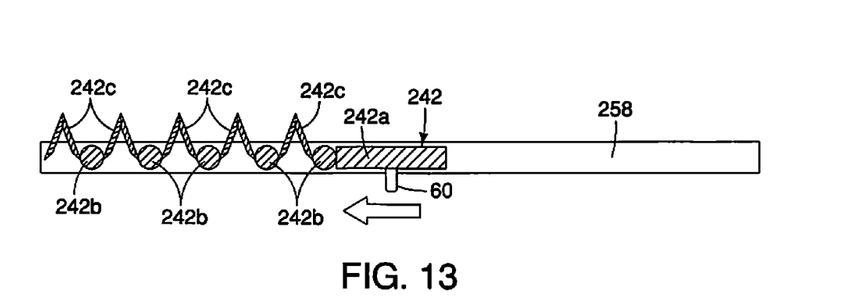
FIG. 13 is another cross-sectional view of a portion of the housing showing the door in the open position in accordance with the third embodiment.
Figure 14:
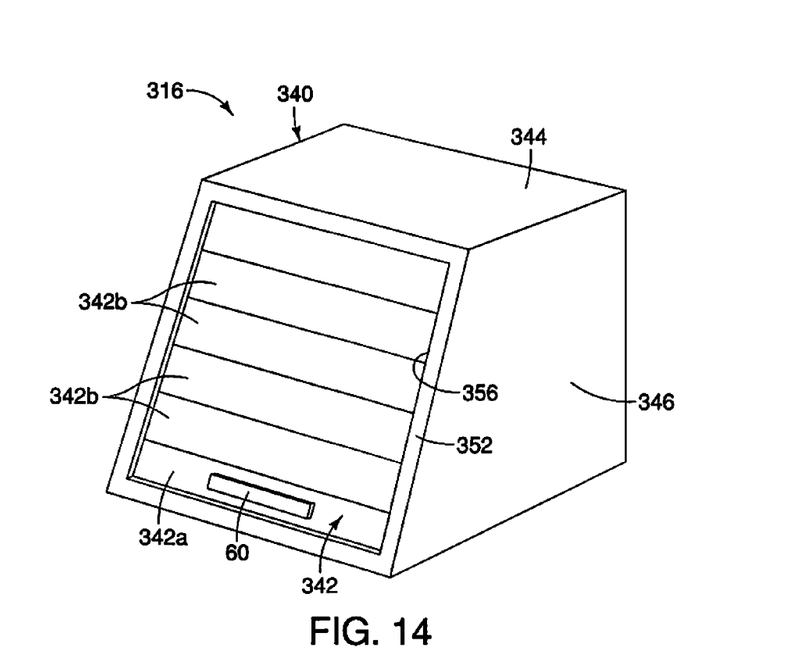
FIG. 14 is a perspective view of a tether cover assembly showing details of the housing and a door with the door in a closed position in accordance with a fourth embodiment.
Figure 15:
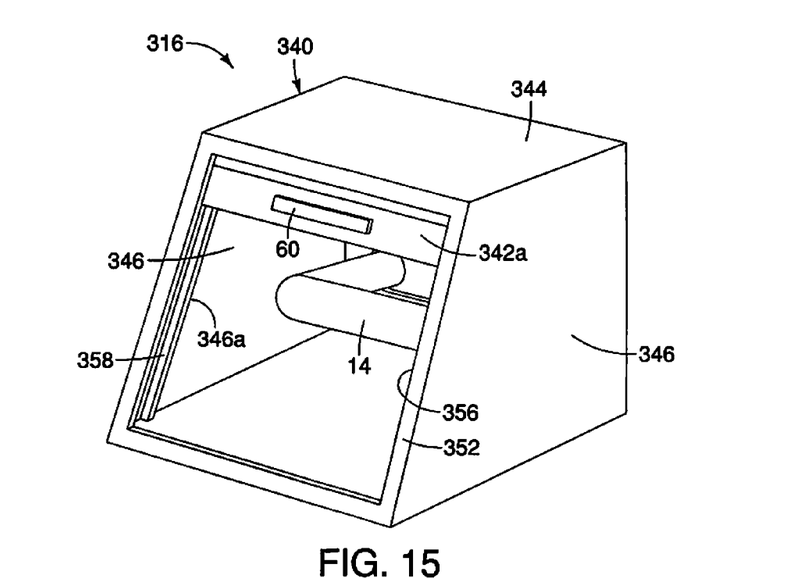
FIG. 15 is another perspective view of the tether cover assembly similar to FIG. 14 showing details of the housing and the door with the door slid to the open position in accordance with the fourth embodiment.

As shown in FIGS. 12 and 13, the door 242 is configured to move in a horizontal direction between the closed position (FIG. 12) and the open position (FIG. 13) along the track 258. The door 242 includes a free end portion 242a, pins 242b and folding sections 242c. The door 242 is basically an accordion-style folding structure that is configured such that as the free end portion 242a of the door 242 slides along the linear tracks 258 from the closed position (FIG. 12) to the open position (FIG. 13) the accordion-style folding structure sections (the folding sections 242c) thereof fold against one another. The pins 242b similarly slide along the tracks 258 supporting the folding section 242c.

Fourth Embodiment

Referring now to FIGS. 14-17, a tether cover assembly 316 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Figure 16:
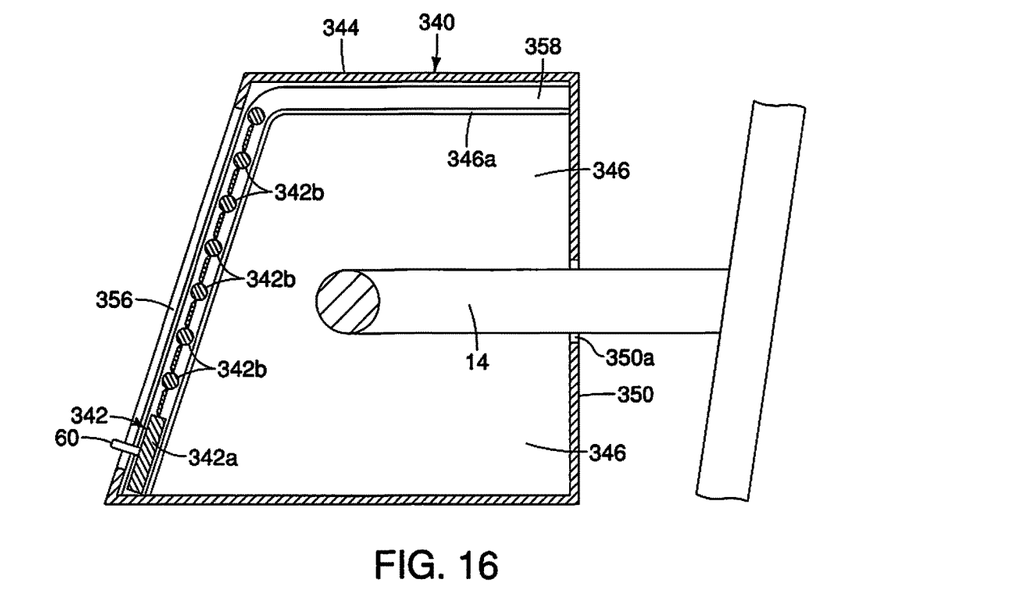
FIG. 16 is a side cross-sectional view of the tether cover assembly depicted in FIGS. 14 and 15 showing details of the housing and the door with the door in the closed position in accordance with the fourth embodiment.
Figure 17:
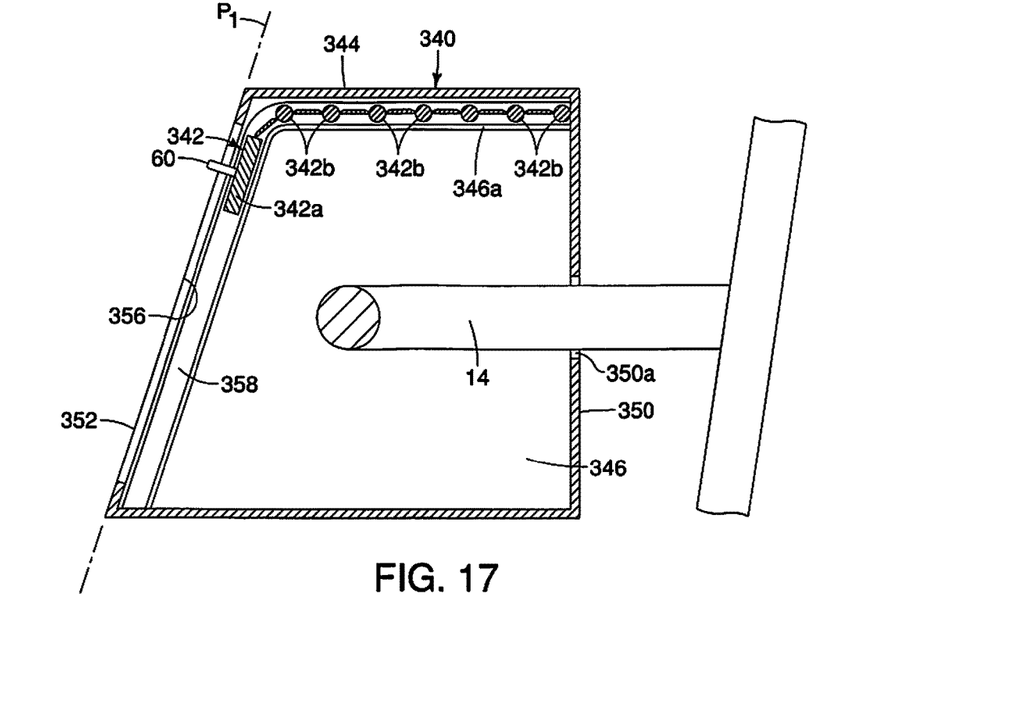
FIG. 17 is another cross-sectional view of the tether cover assembly similar to FIG. 16 showing details of the housing and the door with the door slid to the open position in accordance with the fourth embodiment.

The tether cover assembly 316 includes a housing 340 and a door 342. The housing 340 includes an upper wall 344, a lower wall 348, a rear wall 350 and a front opening section 352. The upper wall 344 is similar to the upper wall 44, except the upper wall 344 does not includes the door slot 44a. The side walls 346 are identical to the side walls 46 except that lips 346a are formed on each of the side walls 346. The lips 346a extend adjacent to the front opening section 352, and curve in a horizontal direction continuing to extend adjacent to the upper wall 344, as shown in FIGS. 16 and 17. The lips 346a and the adjacent portions of the front opening section 352 and the upper wall 344 define tracks 358, as shown in FIGS. 16 and 17.

The rear wall 350 is basically the same as the rear wall 50 of the first embodiment and includes an opening 350a that receives the tether wire 14. The front opening section 352 is basically the same as the front opening section 52 of the first embodiment and defines the opening 356.

As shown in FIGS. 16 and 16, the door 342 is a flexible door, much like that in a roll-top desk. More specifically, the door 342 is configured to move in upward and then rearward in a horizontal direction between a closed position (FIG. 16) and an open position (FIG. 17) along the tracks 358. The door 342 includes a free end portion 342a and hinged portions 342b that pivot relative to one another. Hence, the housing 340 includes a pair of tracks 358 each having a curved portion and a linear portion. A portion of the tracks 358 extends along the front opening section 52 and hence, coincides with or is parallel to the first plane $P_1$.

Fifth Embodiment

Figure 18:
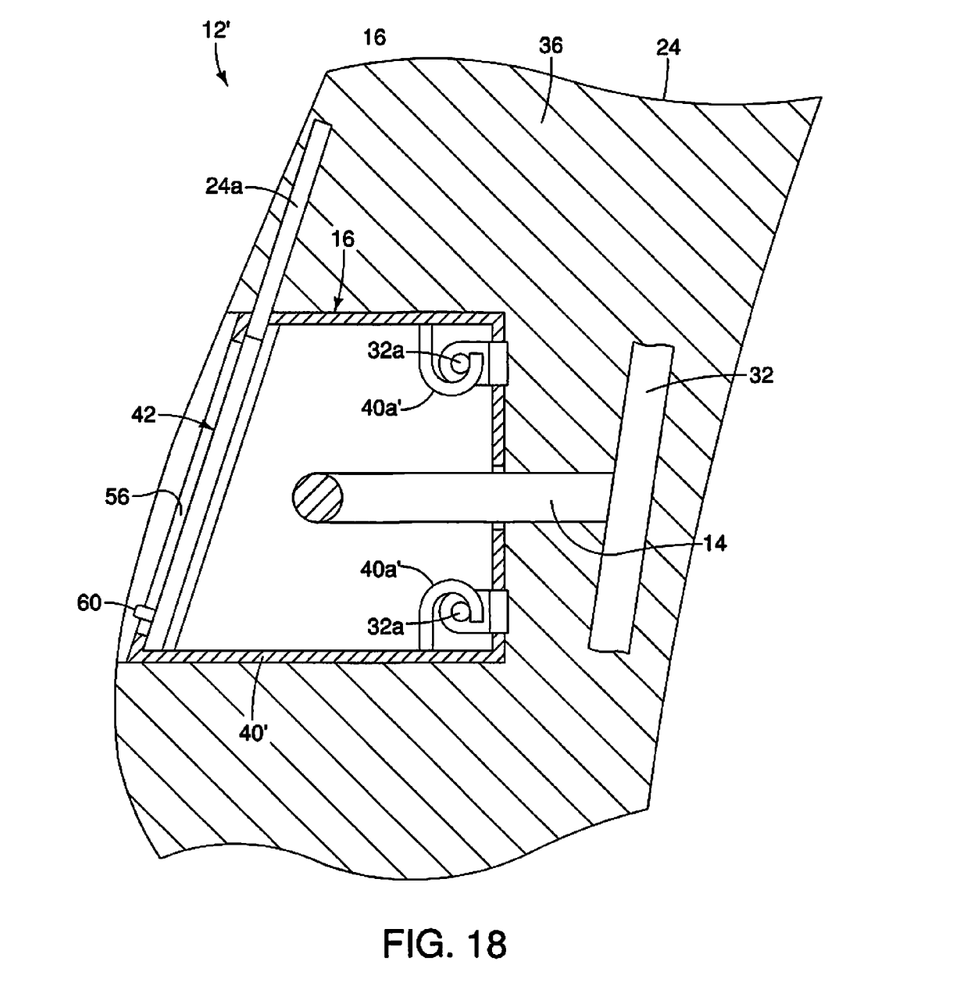
FIG. 18 is a side cross-sectional view of a portion of a rear seat showing a housing and a door of the tether cover assembly secured to the rear seat with an alternative attachment structure in accordance with a fifth embodiment.

Referring now to FIG. 18, a tether cover assembly 12' in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. The parts of the fifth embodiment that differ from the parts of the first embodiment will be indicated with a single prime (').

The tether cover assembly 12' includes a housing 40' and the door 42 (of the first embodiment). The housing 40' is identical to the housing 40 of the first embodiment except that the fastener section 54 of the first embodiment are omitted. Instead, snap fitting projections 40a' are fitted to interior surfaces of the housing 40' for snap-fitting engagement with portions 32a of the metallic frame 32 of the rear seat 12. The configuration of the tether cover assembly 12' is an alternative way of installing the housing 40' to the recessed area 26 of the rear seat 12.

The various vehicle elements and structure of the vehicle 10 are conventional components that are well known in the art. Since such vehicle elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having"

and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seat assembly. Accordingly, these terms, as utilized to describe the present invention should be interpreted relative to a vehicle equipped with the vehicle seat assembly.

The term "configured" as used herein to describe a component, section or part of a device includes structure that is constructed and/or designed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seat assembly, comprising:
   a seat portion having a passenger receiving surface configured and shaped to contact a portion of a passenger seated there-against, at least a portion of the passenger receiving surface coinciding with a first plane, the seat portion having a resilient cushioning material disposed therein with a recessed area being defined within the resilient cushioning material and being open to the passenger receiving surface;
   a tether wire for securing child seat located within the recessed area; and
   a tether cover assembly having a housing defining a door opening and at least one door configured to move from a closed position concealing the tether wire and the door opening and an open position exposing the tether wire and the door opening, the door being a flat and planar member, the housing being installed within the recessed area such that with the door in the closed position the door is parallel to the first plane, and movement of the door from the closed position to the open position includes the door moving along a straight path that is parallel to the first plane.

2. The vehicle seat assembly according to claim 1, wherein
   the door is configured to move in a vertical direction from the closed position to the open position.

3. The vehicle seat assembly according to claim 1, wherein
   the door is configured to move in a horizontal direction from the closed position to the open position.

4. The vehicle seat assembly according to claim 1, wherein
   the housing includes a pair of linear tracks that extend parallel to the first plane, and the door slides along the pair of linear tracks from the closed position to the open position.

5. The vehicle seat assembly according to claim 1, wherein
   the seat portion is a seat back portion of a seat structure with the passenger receiving surface extending upward away from a rear end of a seat cushion portion.

6. The vehicle seat assembly according to claim 1, wherein
   the seat portion includes a rigid seat frame with the tether wire being rigidly and non-movably fixed to the rigid seat frame.

7. A vehicle seat assembly, comprising:
   a seat portion having a passenger receiving surface configured and shaped to contact a portion of a passenger seated there-against, at least a portion of the passenger receiving surface coinciding with a first plane, the seat portion having a resilient cushioning material disposed therein with a recessed area being defined within the resilient cushioning material and being open to the passenger receiving surface, the recessed area and adjacent portions of the seat portion being located on a rearward side of the first plane and a passenger receiving area being located on a forward side of the first plane;
   a tether wire for securing child seat located within the recessed area; and
   a tether cover assembly having a housing defining a door opening and at least one door, the housing including a pair of straight tracks that are parallel to and are located at the rearward side of the first plane at opposite sides of the door opening, the door being configured to slide along the pair of straight tracks between a closed position and an open position such that in the closed position the door conceals the tether wire and the door opening, and in the open position the door exposes the tether wire and the door opening, the housing being installed within the recessed area such that movement of the door between the closed position and the open position is confined to movement at the first side of the first plane with the door being prevented from crossing through the first plane to the second side of the first plane and to the passenger receiving area.

8. The vehicle seat assembly according to claim 7, wherein
   the door is configured to move in a vertical direction from the closed position to the open position.

9. The vehicle seat assembly according to claim 7, wherein
   the door is configured to move in a horizontal direction from the closed position to the open position.

10. The vehicle seat assembly according to claim 7, wherein
    the door slides along the pair of straight tracks from the closed position to the open position.

11. The vehicle seat assembly according to claim 7, wherein
the seat portion is a seat back portion of a seat structure with the passenger receiving surface extending upward away from a rear end of a seat cushion portion.

12. The vehicle seat assembly according to claim 7, wherein
the seat portion includes a rigid seat frame with the tether wire being rigidly and non-movably fixed to the rigid seat frame.

13. A vehicle seat assembly, comprising:
a seat portion having a passenger receiving surface configured and shaped to contact a portion of a passenger seated there-against, at least a portion of the passenger receiving surface coinciding with a first plane, the seat portion having a resilient cushioning material disposed therein with a recessed area being defined within the resilient cushioning material and being open to the passenger receiving surface, the recessed area and adjacent portions of the seat portion being located on a rearward side of the first plane and a passenger receiving area being located on a forward side of the first plane, the resilient cushioning material defining a pocket that extends from the recessed area at the rearward side of the first plane;
a tether wire for securing child seat located within the recessed area; and
a tether cover assembly having a housing defining a door opening and a door, the housing being installed within the recessed area of the seat portion, the door being configured to move from a closed position concealing the tether wire and the door opening, and an open position exposing the tether wire and the door opening such that in the open position at least a portion of the door moves outside of the housing and into the pocket of the resilient cushioning material and in the closed position the door moves out the pocket of the resilient cushioning material into the housing.

14. The vehicle seat assembly according to claim 13, wherein
the pocket defined within the resilient cushion material extends from an upper side of the recessed area.

15. The vehicle seat assembly according to claim 14, wherein
the door is configured to move in a vertical direction from the closed position to the open position.

16. The vehicle seat assembly according to claim 13, wherein
the pocket defined within the resilient cushion material extends from a lateral side of the recessed area.

17. The vehicle seat assembly according to claim 16, wherein
the door is configured to move in a horizontal direction from the closed position to the open position.

18. The vehicle seat assembly according to claim 13, wherein
the housing includes a pair of linear tracks that extend parallel to the first plane, and the door is a plate-like member that slides along the pair of linear tracks from the closed position to the open position.

19. The vehicle seat assembly according to claim 1, wherein
the seat portion includes a rigid seat frame with the tether wire being rigidly and non-movably fixed to the rigid seat frame.

* * * * *